United States Patent
Yamamoto et al.

(10) Patent No.: US 11,072,683 B2
(45) Date of Patent: Jul. 27, 2021

(54) FURANDICARBOXYLIC ACID-CONTAINING POLYESTERS

(71) Applicant: BASF SE, Ludwigshafen am Rhein (DE)

(72) Inventors: Motonori Yamamoto, Ludwigshafen am Rhein (DE); Michael Bernhard Schick, Ludwigshafen am Rhein (DE)

(73) Assignee: BASF SE

( * ) Notice: Subject to any disclaimer, the term of this patent is extended or adjusted under 35 U.S.C. 154(b) by 7 days.

(21) Appl. No.: 16/471,807

(22) PCT Filed: Nov. 24, 2017

(86) PCT No.: PCT/EP2017/080314
§ 371 (c)(1),
(2) Date: Jun. 20, 2019

(87) PCT Pub. No.: WO2018/114215
PCT Pub. Date: Jun. 28, 2018

(65) Prior Publication Data
US 2020/0095372 A1    Mar. 26, 2020

(30) Foreign Application Priority Data
Dec. 22, 2016 (EP) ..................... 16206302

(51) Int. Cl.
C08G 63/16    (2006.01)

(52) U.S. Cl.
CPC ................... C08G 63/16 (2013.01)

(58) Field of Classification Search
USPC ................................ 528/271, 272
See application file for complete search history.

(56) References Cited

U.S. PATENT DOCUMENTS

| 6,080,521 A * | 6/2000 | Muller .................. G03C 1/52 430/157 |
| 9,234,073 B2 | 1/2016 | Siegenthaler et al. |
| 2009/0123767 A1 | 5/2009 | Gohil et al. |
| 2011/0039999 A1 | 2/2011 | Witt et al. |
| 2011/0250626 A1 | 10/2011 | Williams et al. |
| 2016/0200862 A1* | 7/2016 | Bastioli .................. C08L 67/02 524/47 |
| 2019/0048189 A1 | 2/2019 | Kraemer et al. |

FOREIGN PATENT DOCUMENTS

| CN | 101735438 A | 6/2010 |
| CN | 102007159 A | 4/2011 |
| CN | 102027037 A | 4/2011 |
| CN | 102757552 A | 10/2012 |
| EP | 539541 A1 | 5/1993 |
| EP | 575349 A1 | 12/1993 |
| EP | 652910 A1 | 5/1995 |
| EP | 937120 A2 | 8/1999 |
| EP | 947559 A2 | 10/1999 |
| EP | 965615 A1 | 12/1999 |
| EP | 2184308 A2 | 5/2010 |
| WO | WO-9214782 A1 | 9/1992 |
| WO | WO-9219680 A1 | 11/1992 |
| WO | WO-9403543 A1 | 2/1994 |
| WO | WO-9820073 A2 | 5/1998 |
| WO | WO-2007052847 A1 | 5/2007 |
| WO | WO-2009135921 A1 | 11/2009 |
| WO | WO-2010034711 A1 | 4/2010 |
| WO | WO-2010077133 A1 | 7/2010 |
| WO | WO-2013062408 A1 | 5/2013 |
| WO | WO-2018024450 A1 | 2/2018 |

OTHER PUBLICATIONS

International Search Report for PCT/EP2017/080314 dated Feb. 16, 2018.
Written Opinion of the International Searching Authority for PCT/EP2017/080314 dated Feb. 16, 2018.
European Search Report for EP Patent Application No. 16206302.8, dated Jun. 21, 2017, 3 pages.
Witte, et al., "Simple Synthesis of 2-Substituted 2-Oxazolines and 5,6-Dihydro-4H-1,3-oxazines", Angewandte Chemie International Edition, vol. 11, Issue 4, Apr. 1972, pp. 287-288.

* cited by examiner

Primary Examiner — Terressa Boykin
(74) Attorney, Agent, or Firm — Faegre Drinker Biddle & Reath LLP

(57) ABSTRACT

The invention relates to polyesters containing:
A) an acid component composed of:
  a1) 25 to 100 mol % of 2,5-furandicarboxylic acid or its esters or mixtures thereof
  a2) 0 to 75 mol % of an aliphatic $C_4$-$C_{36}$-dicarboxylic acid or its esters or mixtures thereof and
  a3) 1 to 10 mol % of a sulfonate-containing compound, wherein the mol percentages of the components a1) to a3) sum to 100, and
B) a diol component composed of:
  b1) 98 to 100 mol % based on the components a1) to a3) of component A of a $C_2$- to $C_{12}$-alkanediol or mixtures thereof and
  b2) 0 to 2 mol % based on the components a1) to a3) of a branching agent comprising at least 3 functional groups; and optionally further components.

The invention further relates to the production of the polyesters and the use thereof and to aqueous dispersions and polyester mixtures comprising these polyesters.

16 Claims, No Drawings

FURANDICARBOXYLIC ACID-CONTAINING POLYESTERS

CROSS-REFERENCE TO RELATED APPLICATIONS

This application is a national stage application (under 35 U.S.C. § 371) of PCT/EP2017/080314, filed Nov. 24, 2017, which claims benefit of European Application No. 16206302.8, filed Dec. 22, 2016, both of which are incorporated herein by reference in their entirety.

The invention relates to polyesters consisting of:
A) an acid component composed of:
a1) 25 to 100 mol % based on the components a1) and a2) of 2,5-furandicarboxylic acid or its esters or mixtures thereof
a2) 0 to 75 mol % based on the components a1) and a2) of an aliphatic $C_4$-$C_{36}$-dicarboxylic acid or its esters or mixtures thereof and
a3) 1 to 10 mol % based on the components a1) to a3) of a sulfonate-containing compound, wherein the mol percentages of the components a1) to a3) sum to 100, and
B) a diol component composed of:
b1) 98 to 100 mol % based on the components a1) to a3) of component A of a $C_2$- to $C_{12}$-alkanediol or mixtures thereof and
b2) 0 to 2 mol % based on the components a1) to a3) of a branching agent comprising at least 3 functional groups; and
C) optionally also one or more components selected from:
c1) an ether-containing dihydroxyl compound of formula I

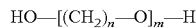 (I)

in which n represents 2, 3 or 4 and m represents an integer from 2 to 250,
c2) a hydroxycarboxylic acid of formula IIa or IIb

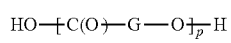 (IIa)

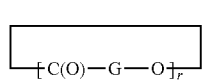 (IIb)

in which p represents an integer from 1 to 1500 and r represents an integer from 1 to 4 and G represents a radical selected from the group consisting of phenylene, —$(CH_2)_q$—, wherein q represents an integer from 1 to 5, —C(R)H— and —C(R)HCH$_2$, wherein R represents a methyl or ethyl
c3) an amino-$C_2$- to $C_{12}$-alkanol or at least one amino-$C_5$- to $C_{10}$-cycloalkanol or mixtures thereof
c4) a diamino-$C_1$- to $C_8$-alkane
c5) a 2,2'-bisoxazoline of general formula III

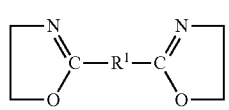 (III)

wherein $R^1$ represents a single bond, a $(CH_2)_z$-alkylene group, where z=2, 3 or 4, or a phenylene group c6) an aminocarboxylic acid selected from the group consisting of caprolactam, 1,6-aminocaproic acid, laurolactam, 1,12-aminolauric acid and 1,11-aminoundecanoic acid
or mixtures of c1) to c6)
wherein the components b1) and b2) and optionally c1), c3) and c4) sum to 100 mol % and the components a1) to a3) and optionally c5) sum to 100 mol % and
D) 0% to 4% by weight based on the components A and B and optionally C of a component
d1) at least one di- or oligo-functional molecule selected from the group consisting of isocyanate and isocyanurate.

The invention further relates to the production of the polyesters and the use thereof and also to aqueous dispersions and polyester mixtures comprising these polyesters.

Furandicarboxylic acid-containing aromatic polyesters are known for example from WO 2010/077133 and furandicarboxylic acid-containing aliphatic-aromatic polyesters from WO 2009/135921. However, these polyesters are not dispersible in water.

CN 102757552 discloses water-soluble furandicarboxylic acid-containing aromatic polyesters having a high content of a sulfonate-containing compound of more than 12 mol % in the examples.

Aqueous dispersions make it possible to unlock attractive applications such as paper coating or impregnation of nonwoven fabrics or articles.

The problem addressed by the present invention is accordingly that of providing such aqueous polyester dispersions.

Interestingly, the polyesters described at the outset comprising preferably 5 to 10 mol % in each case based on the components a1) to a3) of a sulfonate-containing compound solve the stated problem.

The polyesters according to the invention comprising 1 to 5 mol % and preferably 1 to 4.5 mol % and especially preferably 1 to 2 mol % in each case based on the components a1) to a3) of a sulfonate-containing compound are generally water-insoluble. Compared to the polyesters known from WO 2010/077133 and WO 2009/135921 these polyesters according to the invention exhibit increased biodegradability and improved mechanical properties such as elevated tensile strength.

The invention is more particularly described hereinbelow.

The polyesters according to the invention comprise aromatic polyesters comprising 100 mol % based on the components a1) and a2) of a 2,5-furandicarboxylic acid and thus no component a2) and also aliphatic-aromatic polyesters comprising 25 to 99 mol %, preferably 60 to 75 mol % and especially preferably 65 to 75 mol % in each case based on the components a1) and a2) of a 2,5-furandicarboxylic acid and accordingly 1 to 75 mol %, preferably 25 to 40 mol % and especially preferably 25 to 35 mol % of an aliphatic $C_4$-$C_{36}$-dicarboxylic acid in each case based on the components a1) and a2).

2,5-Furandicarboxylic acid (component a1) is known for example from WO 2009/135921 and WO 2013/062408, WO 2010/077133 and WO 2007/052847.

The 2,5-furandicarboxylic acid is preferably employed in the polyester synthesis not as a free acid but rather as a di-$C_1$-$C_8$-alkyl ester, wherein diethyl 2,5-furandicarboxylate and in particular dimethyl 2,5-furandicarboxylate are particularly preferred.

Suitable as the aliphatic $C_4$-$C_{36}$-dicarboxylic acids (componente a2) in the aliphatic-aromatic polyesters are in particular α,ω-$C_4$-$C_{36}$-dicarboxylic acids including for example succinic acid, glutaric acid, adipic acid, suberic acid, azelaic acid, sebacic acid, a 1,12-$C_{12}$-dicarboxylic acid, brassylic acid, 1,16-$C_{16}$-dicarboxylic acid, 1,18-$C_{18}$-dicarboxylic acid or 1,36-$C_{36}$-dicarboxylic acid or mixtures of these dicarboxylic acids. Preference is given to succinic acid, glutaric acid, adipic acid, azelaic acid, sebacic acid or a 1,12-$C_{12}$-dicarboxylic acid or mixtures thereof and especially preferably succinic acid, adipic acid or sebacic acid or mixtures thereof.

The aliphatic $C_4$-$C_{36}$-dicarboxylic acids are preferably also employed in the polyester synthesis not as a free acid but rather as a di-$C_1$-$C_8$-alkyl ester, wherein the respective diethyl ester and in particular the dimethyl ester are particularly preferred.

Suitable as the sulfonate-containing compound (component A3) are in particular aromatic sulfonic acids and salts thereof and especially preferably alkali metal salts thereof. These include for example 1,4-benzenedicarboxylic acid-2-sulfonic acid, 1,3-benzenedicarboxylic acid-5-sulfonic acid—also referred to hereinbelow as isophthalic acid-5-sulfonic acid-, 1,2-benzenedicarboxylic acid-3-sulfonic acid, 1,2-benzenedicarboxylic acid-4-sulfonic acid and salts thereof and especially preferably alkali metal salts thereof. Isophthalic acid-5-sulfonic acid sodium salt (Na—SiP for short) is particularly preferred.

Among both the above-described aromatic polyesters and the aliphatic-aromatic polyesters preference is given to those comprising 5 to 10 mol %, preferably 6 to 9 mol %, based on the components a1) to a3) of a sulfonate-containing compound and particularly preferably isophthalic acid-5-sulfonic acid sodium salt since these are ideally suited for forming aqueous dispersions.

Moreover, among both the above-described aromatic polyesters and the aliphatic-aromatic polyesters preference is given to those comprising 1 to 5 mol %, preferably 1 to 4.5 mol %, based on the components a1) to a3) of a sulfonate-containing compound and particularly preferably isophthalic acid-5-sulfonic acid sodium salt since these are water-insoluble and can be made into films, fibers or moldings having high biodegradability rates and good mechanical properties such as high tensile strength.

Suitable diols (component b1) include aliphatic $C_2$-$C_{12}$-diols such as ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,6-hexanediol, 1,8-octanediol and 2,2,4-trimethyl-1,6-hexanediol, wherein ethylene glycol, 1,3-propanediol, 1,4-butanediol and 2,2-dimethyl-1,3-propanediol (neopentyl glycol) are preferred. The latter also have the advantage that they are obtainable as a renewable raw material. Mixtures of different alkanediols may also be employed.

Preferred aromatic polyesters according to the invention are those which comprise ethylene glycol or cyclohexanedimethanol as the diol component or instead of b1) comprise diethylene glycol or triethylene glycol as component c1) and preferred aliphatic-aromatic polyesters according to the invention are in particular those comprising 1,4-butanediol as the dial component.

Suitable diols (component b1) also include cycloaliphatic $C_6$-$C_{12}$-diols such as cyclopentanediol, 1,4-cyclohexanediol, 1,4-cyclohexanedimethanol (cis/trans), 1,4-di(hydroxymethyl)cyclohexane or 2,5-tetrahydrofurandimethanol, wherein 1,4-cyclohexanedimethanol is preferred.

The polyesters according to the invention generally comprise 0 to 2 mol %, preferably 0.01 to 1.0 mol % and especially preferably 0.05 to 0.3 mol % based on the components a1) to a3) of a branching agent comprising at least 3 functional groups (component b2). The branching agent is preferably an at least trifunctional alcohol or an at least trifunctional carboxylic acid.

Particularly preferred branching agents have three to six functional groups. Examples include: tartaric acid, citric acid, malic acid; trimethylolpropane, trimethylolethane; pentaerythritol; polyethertriols and glycerol, trimesic acid, trimellitic acid, trimellitic anhydride, pyromellitic acid and pyromellitic dianhydride. Preference is given to polyols such as trimethylolpropane, pentaerythritol and especially glycerol. This component makes it possible to construct biodegradable polyesters having a structural viscosity. These biodegradable polyesters are easier to process.

The polyesters according to the invention generally comprise no component C. In specific embodiments it may be added to the polyester according to the invention in a quantity ratio of 0.1 to 30 mol % for example. In all embodiments the components b1) and b2) and optionally c1), c3) and c4) sum to 100 mol %. The components c2 and c6 may be present in the abovementioned quantity ratios independently of the components A and B. The mol percentages of the component c5 and the components a1) to a3) sum to 100.

The optional component C consists of:

c1) an ether-containing dihydroxyl compound of formula I $$HO\text{—}[(CH_2)_n\text{—}O]_m\text{—}H \qquad (I)$$

in which n represents 2, 3 or 4 and m represents an integer from 2 to 250,

Suitable dihydroxyl compounds c1 include diethylene glycol, triethylene glycol, polyethylene glycol, polypropylene glycol and polytetrahydrofuran (poly-THF), particularly preferably diethylene glycol, triethylene glycol and polyethylene glycol, it also being possible to employ mixtures thereof or compounds having differing variables n (see formula I), for example polyethylene glycol comprising propylene units (n=3), for example obtainable by polymerization according to methods known per se initially of ethylene oxide and subsequently with propylene oxide, particularly preferably a polymer based on polyethylene glycol having differing variables n, wherein units formed from ethylene oxide predominate. The molecular weight ($M_n$) of the polyethylene glycol is generally chosen in the range from 250 to 8000, preferably from 600 to 3000, g/mol.

In one of the preferred embodiments it is possible to employ for example 0 to 100 mol %, preferably 70 to 99.5 mol %, of the diols B and 0 to 100 mol %, preferably 0.5 to 30 mol %, of the dihydroxyl compounds c1 based on the molar amount of b1, b2 and c1 for production of the polyesters.

c2) a hydroxycarboxylic acid of formula IIa or IIb

(IIa)

(IIb)

in which p represents an integer from 1 to 1500 and r represents an integer from 1 to 4 and G represents a radical selected from the group consisting of phenylene, —(CH$_2$)$_q$—, wherein q represents an integer from 1 to 5, —C(R)H— and —C(R)HCH$_2$, wherein R represents a methyl or ethyl Hydroxycarboxylic acids c2) employable for producing copolyesters include: glycolic acid, D-lactic acid, L-lactic acid, D,L-lactic acid, 6-hydroxyhexanoic acid, cyclic derivatives thereof such as glycolide (1,4-dioxane-2,5-diose), D- or L-dilactide (3,6-dimethyl-1,4-dioxane-2,5-dione), p-hydroxybenzoic acid and also their oligomers and polymers such as 3-polyhydroxybutyric acid, polyhydroxyvaleric acid, polylactic acid (such as for example the products marketed under the trade name Ingeo® from Nature-Works) and also a mixture of 3-polyhydroxybutyric acid and 4-polyhydroxybutyrates or 3-polyhydroxyvaleric acid or 3-polyhydroxyhexanoic acid, the low molecular weight and cyclic derivatives thereof being particularly preferable for producing polyesters.

The hydroxycarboxylic acids may be employed for example in amounts from 0.01% to 50% by weight, preferably from 0.1% to 30% by weight, based on the amount of A and B.

c3) an amino-C$_2$- to C$_{12}$-alkanol or at least one amino-C$_5$- to C$_{10}$-cycloalkanol or mixtures thereof Preferably employed as the amino-C$_2$-C$_{12}$-alkanol or amino-C$_5$-C$_{10}$-cyloalkanol (component c3), this being intended also to include 4-aminomethylcyclohexanemethanol, are amino-C$_2$-C$_6$-alkanols such as 2-aminoethanol, 3-aminopropanol, 4-aminobutanol, 5-aminopentanol, 6-aminohexanol and amino-C$_5$-C$_6$-cyloalkanols such as aminocyclopentanol and aminocyclohexanol or mixtures thereof.

c4) a diamino-C$_1$- to C$_8$-alkane

Preferably employed as the diamino-C$_1$-C$_8$-alkane (component c4) are diamino-C$_4$-C$_6$-alkanes such as 1,4-diaminobutane, 1,5-diaminopentane and 1,6-diaminohexane (hexamethylenediamine, "HMD").

One preferred embodiment provides for the possibility of employing from 0 to 50 mol %, preferably from 0.1 to 30 mol %, of c3 based on the components A and B and from 0 to 30 mol %, preferably from 0.1 to 30 mol %, of c4 based on the molar amount of B for production of the polyesters.

c5) a 2,2'-bisoxazoline of general formula III

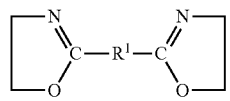

(III)

wherein R$^1$ represents a single bond, a (CH$_2$)$_z$-alkylene group, where z=2, 3 or 4, or a phenylene group, The 2,2'-bisoxazolines c5 are generally obtainable by the process from Angew. Chem. Int. Edit., vol. 11 (1972), pages 287-288. Particularly preferred bisoxazolines are those in which R$^1$ represents a single bond, a (CH$_2$)$_z$-alkylene group where z=2, 3 or 4 such as methylene, ethane-1,2-diyl, propane-1,3-diyl, propane-1,2-diyl, or a phenylene group. Particularly preferred bisoxazolines include 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene.

In one preferred embodiment it is possible to employ 0.1% to 5% by weight, preferably 0.2% to 4% by weight, of c5 based on the total weight of A and B.

c6) an aminocarboxylic acid selected from the group consisting of caprolactam, 1,6-aminocaproic acid, laurolactam, 1,12-aminolauric acid and 1,11-aminoundecanoic acid or mixtures of c1) to c6).

Employable as component c6 are aminocarboxylic acids selected from the group consisting of caprolactam, 1,6-aminocaproic acid, laurolactam, 1,12-aminolauric acid and 1,11-aminoundecanoic acid.

c6 is generally employed in amounts of 0% to 20% by weight, preferably of 0.1% to 10% by weight, based on the total amount of the components A and B.

Generally employed as component d1 are an isocyanate or isocyanurate or a mixture of different isocyanates and isocyanurates. Employable isocyanates are aromatic or aliphatic diisocyanates. However, it is also possible to employ higher-functional isocyanates.

In the context of the present invention an aromatic diisocyanate d1 is to be understood as meaning especially tolylene 2,4-diisocyanate, tolylene 2,6-diisocyanate, 2,2'-diphenylmethane diisocyanate, 2,4'-diphenylmethane diisocyanate, 4,4'-diphenylmethane diisocyanate, naphthylene 1,5-diisocyanate or xylylene diisocyanate.

Particularly preferred as component d1 among these are 2,2'-, 2,4'- and 4,4'-diphenylmethane diisocyanate. The latter diisocyanates are generally employed as mixtures.

Also contemplated as tricyclic isocyanate d1 is tri(4-isocyanatophenyl)methane. The polycyclic aromatic diisocyanates are generated for example in the production of monocyclic or bicyclic diisocyanates.

The component d1 may also comprise urethione groups in subordinate amounts, for example up to 5% by weight, based on the total weight of the component d1, for example for capping the isocyanate groups.

In the context of the present invention an aliphatic diisocyanate d1 is to be understood as meaning especially linear or branched alkylene diisocyanates or cycloalkylene diisocyanates having 2 to 20 carbon atoms, preferably 3 to 12 carbon atoms, for example 1,6-hexamethylene diisocyanate, isophorone diisocyanate or methylenebis(4-isocyanatocyclohexane). Particularly preferred aliphatic diisocyanates d1 are isophorone diisocyanate and in particular 1,6-hexamethylene diisocyanate.

Preferred isocyanurates include the aliphatic isocyanurates deriving from alkylene diisocyanates or cycloalkylene diisocyanates having 2 to 20 carbon atoms, preferably 3 to 12 carbon atoms, for example isophorone diisocyanate or methylenebis(4-isocyanatocyclohexane). The alkylene diisocyanates may be either linear or branched. Particular preference is given to isocyanurates based on n-hexamethylenediisocyanate, for example cyclic trimers, pentamers or higher oligomers of 1,6-hexamethylene diisocyanate.

The component d1 is generally employed in amounts of 0% to 4% by weight, preferably 0.1% to 4% by weight, particularly preferably 0.2% to 1.2% by weight, based on the components A and B and optionally C Aromatic polyesters according to the invention comprise 100 mol % based on the components a1) and a2) of a 2,5-furandicarboxylic acid and thus no component a2). Aromatic polyesters comprise for example: poly(alkylene-2,5-furandicarboxylates) such as poly(ethylene-2,5-furandicarboxylate), poly(propylene-2,5-furandicarboxylate), poly(butylene-2,5-furandicarboxylate), poly(hexylene-2,5-furandicarboxylate), poly(octylene-2,5-furandicarboxylate), or poly(alkoxylene-2,5-furandicarboxylates) such as poly(ethoxyethylene-2,5-furandicarboxylates) or poly(diethoxyethylene-2,5-furandicarboxylates).

Aliphatic-aromatic polyesters according to the invention comprise 25 to 99 mol %, preferably 60 to 75 mol % and especially preferably 65 to 75 mol % of a 2,5-furandicarboxylic acid and accordingly 1 to 75 mol %, preferably 25 to 40 mol % and especially preferably 25 to 35 mol % of an aliphatic $C_4$-$C_{36}$-dicarboxylic acid. Aliphatic-aromatic polyesters comprise in particular: polybutylene-2,5-furandicarboxylate-co-adipate, polybutylene-2,5-furandicarboxylate-co-azelate, polybutylene-2,5-furandicarboxylate-co-sebacate, polybutylene-2,5-furandicarboxylate-co-brassylate, polybutylene-2,5-furandicarboxylate-co-1,12-$C_{12}$-dicarboxylate, polybutylene-2,5-furandicarboxylate-co-1,18-$C_{18}$-dicarboxylate and polybutylene-2,5-furandicarboxylate-co-1,36-$C_{36}$-dicarboxylate.

The polyesters according to the invention generally have a number-average molecular weight (Mn) in the range from 5000 to 100 000, in particular in the range from 10 000 to 75 000 g/mol, preferably in the range from 15 000 to 38 000 g/mol, a weight-average molecular weight (Mw) of 30 000 to 300 000, preferably 60 000 to 200 000 g/mol, and an Mw/Mn ratio of 1 to 6, preferably 2 to 4. The viscosity number according to EN-ISO 1628-1:2012-10 (measured in a 0.05 g/ml solution of phenol/o-dichlorobenzene (1:1)) is between 50 and 450, preferably from 80 to 250 ml/g (measured in o-dichlorobenzene/phenol (50/50 weight ratio)). The melting point is in the range from 85° C. to 150° C., preferably in the range from 95° C. to 140° C.

In the context of the present invention the feature "biodegradable" is fulfilled for a substance or a substance mixture when this substance or the substance mixture has a percentage degree of biodegradation according to DIN EN 13432 of at least 90%.

Biodegradability generally results in the polyester (mixtures) decomposing in an appropriate and verifiable timeframe. The degradation may be effected enzymatically, hydrolytically, oxidatively and/or by the action of electromagnetic radiation, for example UV radiation, and may usually be brought about predominantly by the action of microorganisms such as bacteria, yeasts, fungi and algae. Biodegradability may be quantified for example when polyesters are mixed with compost and stored for a certain time. For example according to DIN EN 13432 $CO_2$-free air is passed through matured compost during composting and said compost is subjected to a defined temperature program. Biodegradability is here defined via the ratio of the net $CO_2$ release from the sample (after subtracting the $CO_2$ release by the compost without a sample) to the maximum $CO_2$ release from the sample (calculated from the carbon content of the sample) as a percentage degree of biodegradation. Biodegradable polyester (mixtures) generally show distinct signs of degradation such as fungus growth and tear and hole formation after just a few days of composting.

Other methods for determining biodegradability are described for example in ASTM D 5338 and ASTM D 6400.

The polyesters according to the invention are suitable in particular for producing films, fibers and moldings. The thus produced materials have a high biodegradability according to DIN EN 13432 and attractive mechanical properties such as in particular a high tensile strength.

To produce the aqueous dispersions the polyester according to the invention is mixed into the aqueous dispersion medium with a suitable mixing means such as for example a rotor-stator mixer, an extruder, a stirred tank or a static mixer.

In a preferred embodiment the polyester according to the invention and the aqueous dispersion medium preferably comprising at least one surface-active substance are supplied to the mixer simultaneously, preferably continuously, and in particular at a constant volume rate while withdrawing the aqueous dispersion at the same rate.

However, it is also possible in a preceding step to mix the polyester according to the invention with the aqueous dispersion medium which comprises the at least one surface-active substance to obtain a primary emulsion at a temperature above the melting/softening temperature of the polymer and to supply this mixture to the mixer. This preceding step is preferably performed in a kneader or extruder. The thus obtained pre-emulsion is subsequently supplied to the mixer(s).

The aqueous dispersion medium comprises not only water but generally also at least one surface-active substance. These include polymeric surface-active substances having molecular weights above 2000 Dalton (number-average) which are generally described as protective colloids and low molecular weight surface-active substances having molecular weights up to 2000 Dalton, often up to 1500 Dalton (number-average), which are generally described as emulsifiers. The surface-active substances may be cationic, anionic or neutral. In a preferred embodiment of the invention the aqueous dispersion medium comprises at least one protective colloid, for example a neutral, anionic or cationic protective colloid, optionally in combination with one or more emulsifiers.

Examples of protective colloids are water-soluble polymers such as for example neutral protective colloids: for example polysaccharides, for example water-soluble starches, starch derivatives and cellulose derivatives such as methylcellulose, hydroxypropylcellulose, hydroxyethylcellulose, hydroxypropylmethylcellulose, also polyvinyl alcohols, including partially saponified polyvinyl acetate having a degree of saponification of preferably at least 40%, in particular at least 60%, polyacrylamide, polyvinylpyrrolidone, polyethylene glycols, graft polymers of vinyl acetate and/or vinyl propionate onto polyethylene glycols, polyethylene glycols end-capped at one end or both ends with alkyl, carboxyl or amino groups.

anionic water-soluble polymers whose polymer backbone comprises a multiplicity of carboxyl groups, sulfonic acid groups/sulfonate groups and/or phosphonic acid groups/phosphonate groups, for example carboxymethylcellulose, homo- and copolymers of ethylenically unsaturated monomers comprising at least 20% by weight based on the total amount of the monomers of at least one ethylenically unsaturated monomer which comprises incorporated in it by polymerization at least one carboxyl group, sulfonic acid group and/or phosphonic acid group and salts thereof, in particular the alkali metal and ammonium salts. In the abovementioned anionic water-soluble polymers the aqueous dispersion medium typically comprises the sulfonic acid groups bonded to the polymer backbone in salt form, i.e. as sulfonate groups, and correspondingly comprises the phosphonic acid groups as phosphonate groups. The counterions are then typically alkali metal ions and alkaline earth metal ions such as sodium ions, calcium ions and ammonium ions (NH4+);

cationic polymers such as polydiallyldimethylammonium salts, for example chlorides;

anionically or cationically modified starches; examples of anionically modified starches are carboxymethylated starches and n-octenylsuccinyl-modified starches, as are obtainable for example in the form of products from Cargill (CEmCap/CEmTex/CDeliTex n-octenylsuccinylated starches).

Customary anionic emulsifiers are the salts of amphiphilic substances comprising an anionic functional group, for example a sulfonate, phosphonate, sulfate or phosphate group. These include for example the salts, in particular the alkali metal and ammonium salts, of alkyl sulfates (alkyl radical: $C_8$ to $C_{12}$), the salts, in particular the alkali metal and ammonium salts, of amphiphilic compounds comprising a sulfated or phosphated oligo-$C_2$-$C_3$-alkylene oxide group, in particular a sulfated or phosphated oligoethylene oxide group, such as for example the salts, in particular the alkali metal and ammonium salts, of sulfuric monoesters of ethoxylated alkanols (degree of ethoxylation from 2 to 50, in particular 4 to 30, alkyl radical: $C_{10}$ to $C_{30}$, in particular $C_{12}$ to $C_{18}$), the salts, in particular the alkali metal and ammonium salts, of sulfuric monoesters of ethoxylated alkylphenols (degree of ethoxylation from 2 to 50, alkyl radical: $C_4$ to $C_{12}$), the salts, in particular the alkali metal and ammonium salts, of phosphoric monoesters of ethoxylated alkanols (degree of ethoxylation from 2 to 50, in particular 4 to 30, alkyl radical: $C_{10}$ to $C_{30}$, in particular $C_{12}$ to $C_{16}$), the salts, in particular the alkali metal and ammonium salts, of phosphoric monoesters of ethoxylated alkylphenols (degree of ethoxylation from 2 to 50, alkyl radical: $C_4$ to $C_{12}$), the salts, in particular the alkali metal and ammonium salts, of alkylsulfonic acids (alkyl radical: $C_{12}$ to $C_{18}$), the salts, in particular the alkali metal and ammonium salts, of alkylarylsulfonic acids (alkyl radical: $C_9$ to $C_{18}$), and the salts, in particular the alkali metal and ammonium salts, of alkyl biphenyl ether sulfonic acids (alkyl radical: $C_6$ to $C_{18}$) such as for example the product marketed under the designation Dowfax® 2A1.

Suitable cationic emulsifiers are generally cationic salts comprising a $C_6$-$C_{18}$-alkyl, $C_6$-$C_{10}$-alkylaryl or heterocyclic radical, for example primary, secondary, tertiary or quaternary ammonium salts, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts, in particular their sulfates, methosulfates, acetates, chlorides, bromides, phosphates, hexafluorophosphates and the like.

The aqueous dispersion medium generally comprises the surface-active substance in a concentration of 0.5% to 20% by weight, often in a concentration of 1% to 10% by weight, in particular in a concentration of 1% to 5% by weight, based on the aqueous dispersion medium.

In addition to water and the surface-active substance the aqueous dispersion medium may comprise small amounts of further constituents, for example defoamers. The proportion of constituents distinct from water and surface-active substance will generally not exceed 5% by weight, in particular 1% by weight, of the aqueous dispersion medium. The aqueous dispersion medium preferably comprises negligible amounts, if any, of volatile organic solvents. In particular the content of volatile organic solvents is less than 1% by weight, in particular less than 5000 ppm and especially less than 1000 ppm. The term volatile organic solvents is to be understood as meaning organic solvents having a boiling point below 250° C. at standard pressure.

The abovementioned aqueous dispersions are suitable in particular for paper coating or for impregnation of a non-woven fabric or article.

The present invention is further directed to polyester mixtures comprising:

i) 5% to 95% by weight, preferably 20% to 80% by weight, in each case based on the polyester mixture of the abovedescribed polyester according to the invention,
ii) 95% to 5% by weight, preferably 80% to 20% by weight, in each case based on the polyester mixture of at least one or more components selected from the group consisting of: a polyester produced from an aliphatic dicarboxylic acid and an aliphatic dial; polycaprolactone, starch, cellulose, polyhydroxyalkanoate, polyglycolic acid and polylactic acid.

It is preferable to employ PLA having the following profile of properties:
a melt volume rate (MVR) according to EN ISO 1133 (190° C., 2.16 kg weight) of 0.5 to 30, in particular 2 to 40, cm³/10 min)
a melting point below 240° C.;
a glass transition temperature (Tg) greater than 55° C.
a water content of less than 1000 ppm
a residual monomer content (lactide) of less than 0.3%
a molecular weight of greater than 80 000 Dalton.

Preferred polylactic acids are for example Ingeo® 8052D, 6201D, 6202D, 6251D, 3051D and in particular Ingeo® 4020D, 4032D or 4043D (polylactic acid from NatureWorks).

The term aliphatic polyesters of aliphatic diols and aliphatic dicarboxylic acids is to be understood as meaning the following polyesters: polybutylene succinate (PBS), polybutylene adipate (PBA), polybutylene succinate adipate (PBSA), polybutylene succinate sebacate (PBSSe), polybutylene sebacate (PBSe) or corresponding polyesters having a polyesteramide or polyester urethane substructure. The aliphatic polyesters are marketed under the name GS Pla® by Mitsubishi for example. More recent developments are described in WO-A 2010/034711.

Polyhydroxyalkanoates are primarily to be understood as meaning poly-4-hydroxybutyrates and poly-3-hydroxybutyrates and copolyesters of the abovementioned polyhydroxybutyrates with 3-hydroxyvalerate, 3-hydroxyhexanoate and/or 3-hydroxyoctanoate. Poly-3-hydroxybutyrates are marketed for example by PHB Industrial under the brand Biocycle® and by Tianan under the name Enmat®.

Poly-3-hydroxybutyrate-co-4-hydroxybutyrates are known from Metabolix in particular. They are sold under the trade name Mirel®.

Poly-3-hydroxybutyrate-co-3-hydroxyhexanoates are known from P&G or Kaneka. Poly-3-hydroxybutyrate-co-3-hydroxyhexanoates generally have a 3-hydroxyhexanoate proportion of 1 to 20 and preferably of 3 to 15 mol % based on the polyhydroxyalkanoate. The polyhydroxyalkanoates generally have a molecular weight Mw of 100 000 to 1 000 000 and preferably of 300 000 to 600 000.

Starch is to be understood as also including amylose; thermoplasticized is to be understood as meaning thermoplasticized with plasticizers such as glycerol, sorbitol or water for example (see EP-A 539 541, EP-A 575 349, EP-A 652 910) or else surface modified (see EP-A 937120, EP-A 947559, EP-A 965615). Polymer mixtures according to the invention comprising 10% to 35% by weight based on the total weight of the polymer mixture of thermoplastic or non-thermoplastic starch exhibit not only good degradability in the soil but also good mechanical properties such as in particular a high tear propagation resistance.

The polyesters or polyester mixtures according to the invention may also comprise further additives known to those skilled in the art. Examples include the additives customary in the plastics industry such as stabilizers; nucleating agents; lubricants and release agents such as stearates (especially calcium stearate); plasticizers, for example citric esters (especially acetyl tributyl citrate), glyceryl esters such as triacetylglycerol or ethylene glycol derivatives, surfactants such as polysorbates, palmitates or laurates; waxes, for example erucamide, stearamide or behenamide, beeswax or beeswax esters; antistats, UV absorbers; UV stabilizers; antifogging agents or dyes.

The additives are used in concentrations of 0% to 2% by weight, in particular 0.1% to 2% by weight, based on the inventive polyester or the polyester mixture. Plasticizers may be present in amounts of 0.1% to 10% by weight based on the inventive polyester or the polyester mixture.

It is also possible to add to the polymer mixtures, in particular the polylactic acid-containing mixtures, 0% to 1% by weight, preferably 0.01 to 0.8% by weight, particularly preferably 0.05 to 0.5% by weight, based on the total weight of the polymer mixture of an epoxy-containing copolymer based on styrene, acrylic ester and/or methacrylic ester. The epoxy-bearing units are preferably glycidyl (meth)acrylates. Copolymers having a glycidyl methacrylate proportion of greater than 20%, particularly preferably of greater than 30% and especially preferably of greater than 50% by weight of the copolymer have proven advantageous. The epoxy equivalent weight (EEW) in these polymers is preferably 150 to 3000 and especially preferably 200 to 500 g/equivalent. The average molecular weight (weight-average) $M_w$ of the polymers is preferably 2000 to 25 000, in particular 3000 to 8000. The average molecular weight (number-average) $M_n$ of the polymers is preferably 400 to 6000, in particular 1000 to 4000. The polydispersity (Q) is generally between 1.5 and 5. Epoxy-containing copolymers of the abovementioned type are for example marketed by BASF Resins B.V. under the brand Joncryl® ADR. Joncryl® ADR 4368 which is employed especially in PLA-containing polyester mixtures is particularly suitable.

The polyesters and polyester mixtures according to the invention may preferably comprise the following fillers.

Calcium carbonate may be employed for example at 10% to 25% by weight, preferably 10% to 20% by weight, particularly preferably 12% to 28% by weight, based on the total weight of the polymer mixture. Calcium carbonate from Omya, inter alia, has proven suitable. The calcium carbonate generally has an average particle size of 0.5 to 10 micrometers, preferably 1-5 and particularly preferably 1-2.5 micrometers.

Talc may be employed for example at 3% to 15% by weight, preferably 5% to 10% by weight, particularly preferably 5% to 8% by weight, based on the total weight of the polymer mixture. Talc from Mondo Minerals, inter alia, has proven suitable. The talc generally has an average particle size of 0.5-10, preferably 1-8, particularly preferably 1-3 micrometers.

Yet further minerals that may be present in addition to the fillers calcium carbonate and talc include: graphite, gypsum, carbon black, iron oxide, calcium chloride, kaolin, silicon dioxide (quartz), sodium carbonate, titanium dioxide, silicate, wollastonite, mica, montmorillonites, mineral fibers and natural fibers.

Natural fibers generally include cellulose fibers, kenaf fibers, hemp fibers, wood flour and potato peel. These are preferably employed at 1% to 20% by weight based on the polymer mixture.

The minerals including the fillers calcium carbonate and talc may also be employed as nanofillers. Nanofillers include in particular finely divided phyllosilicates, preferably argillaceous minerals, particularly preferably montmorillonite comprising argillaceous minerals, the surface of which has been modified with one or more quaternary ammonium salts and/or phosphonium salts and/or sulfonium salts. Preferred argillaceous minerals are natural montmorillonites and bentonites.

Fillers may overall be added to the polyester mixtures for example at 10% to 35% by weight based on the total weight of the polymer mixture.

Performance Testing

The molecular weights Mn and Mw of the polyesters were determined by GPC according to DIN 55672-1: 2016-03.

The viscosity numbers were determined according to EN-ISO 1628-1:2012-10, capillary viscometry. An Ubbelohde M-II microviscometer was used. The solvent used was the mixture: phenol/o-dichlorobenzene in a weight ratio of 50/50.

The elastic modulus and the yield stress were determined according to ISO 527-3: 2003 by a tensile test using tensile bars having a thickness of about 420 μm.

The melting temperature Tm and the glass transition temperature Tg were determined according to DIN EN ISO 11357-3:2913-04.

EXAMPLES

General Procedure for Producing the Aromatic Polyesters According to the Invention To produce polyesters 1 to 9 and polyester 1a, 92 mol % of 2,5-dimethylfurandicarboxylic acid (2,5-dimethylfuranate DM-FDCA) and 8 mol % of dimethyl sodium sulfoisophthalic acid (DMNaSIP), 130 mol % of diol and the amounts of glycerol specified below were mixed together with the amounts of tetrabutyl orthotitanate specified below (TBOT). The reaction mixture was heated to a temperature of 180° C. and reacted at this temperature for 2 h. The temperature was then increased to 240° C. and excess diol was distilled off under vacuum over a period of 2 h. The amounts of hexamethylene diisocyanate (HDI) specified below were then added slowly over 10 min at 240° C.

Example 1

92.2 g (92 mol %) of 2,5-dimethylfuranate; 12.8 g (8 mol %) of DMNaSIP; 43.9 g (130 mol %) of ethylene glycol; 0.1 g of glycerol; 0.07 g of TBOT; 0.83 g of HDI Glass transition temperature (Tg): 87° C., viscosity number (VN): 87, elastic modulus: 2900 MPa, yield stress: 78 MPa Example 1a 92.2 g (92 mol %) of 2,5-dimethylfuranate; 12.8 g (8 mol %) of DMNaSIP; 43.9 g (130 mol %) of ethylene glycol; 0.1 g of glycerol; 0.07 g of TBOT;

Tg: 87° C., VN: 55, elastic modulus: 2860 MPa, yield stress: 46 MPa

Example 2

92 mol % of 2,5-dimethylfuranate; 8 mol % of DMNaSIP; 130 mol % of diethylene glycol; 0.11 g of glycerol; 0.08 g of TBOT; 0.85 g of HDI Tg: 45° C., VN: 105

Example 3

92 mol % of 2,5-dimethylfuranate; 8 mol % of DMNaSIP; 130 mol % of 1,4-butanediol; 0.1 g of glycerol; 0.07 g of TBOT; 0.84 g of HDI Tg: 38° C., VN: 93

Example 4

92 mol % of 2,5-dimethylfuranate; 8 mol % of DMNaSIP; 130 mol % of 1,6-hexanediol; 0.11 g of glycerol; 0.08 g of TBOT; 0.85 g of HDI
Tg: 10° C., VN: 83

Example 5

92 mol % of 2,5-dimethylfuranate; 8 mol % of DMNaSIP; 130 mol % of 1,8-octanediol; 0.11 g of glycerol; 0.08 g of TBOT; 0.85 of HDI
Tg: 8° C., VN: 98

Example 6

92 mol % of 2,5-dimethylfuranate; 8 mol % of DMNaSIP; 130 mol % of neopentyl glycol; 0.11 g of glycerol; 0.08 g of TBOT; 0.85 g of HDI
Tg: 43° C., VN: 92

Example 7

92 mol % of 2,5-dimethylfuranate; 8 mol % of DMNaSIP; 130 mol % of 1,4-cyclohexanedimethanol; 0.08 g of glycerol; 0.06 g of TBOT; 0.87 g of HDI
Tg: 95° C., VN: 72

Example 8

92 mol % of 2,5-dimethylfuranate; 8 mol % of DMNaSIP; 130 mol % of triethylene glycol; 0.11 g of glycerol; 0.08 g of TBOT; 0.86 g of HDI
Tg: 11° C., VN: 76

Example 9

92 mol % of 2,5-dimethylfuranate; 8 mol % of DMNaSIP; 130 mol % of tetraethylene glycol; 0.11 g of glycerol; 0.08 g of TBOT; 0.86 g of HDI
Tg: 4° C., VN: 81

General Procedure for Producing the Aliphatic-Aromatic Polyesters:

To produce polyesters 10 to 16, 68/62 mol % of 2,5-dimethylfurandicarboxylic acid (2,5-dimethylfuranate) and 2/8 mol % of dimethyl sodium sulfoisophthalic acid (DMNaSIP), 130 mol % of 1,4-butanediol and 0.1% by weight of glycerol—based on the polyester—were mixed together with 0.07 g of tetrabutyl orthotitanate (TBOT) (100 ppm of Ti). The reaction mixture was heated to a temperature of 180° C. and reacted at this temperature for 1 h. 30 mol % of aliphatic dicarboxylic acid were then added and the mixture was reacted for a further 1 h. The temperature was then increased to 240° C. and excess dihydroxyl compound was distilled off under vacuum over a period of 2 h. 0.8% by weight of hexamethylene diisocyanate (HDI)—based on the polyester—were then added slowly over 10 min at 240° C.

Example 10

62.6 g (68 mol %) of 2,5-dimethylfuranate; 3.0 g (2 mol %) of DMNaSIP; 30.3 g (30 mol %) of sebacic acid; 58.5 g (130 mol %) of 1,4-butanediol;
Melting point (Tm): 128° C., Tg: −9° C., VN 167

Example 11

57.0 g (62 mol %) of 2,5-dimethylfuranate; 11.8 g (8 mol %) of DMNaSIP; 30.3 g (30 mol %) of sebacic acid; 58.5 g (130 mol %) of 1,4-butanediol;
Tm: 120° C., Tg: −1° C., VN: 154

Example 12

68 mol % of 2,5-dimethylfuranate; 2 mol % of DMNaSIP; 30 mol % of adipic acid; 130 mol % of 1,4-butanediol;
Tm: 129° C., Tg: −5° C., VN 145

Example 13

68 mol % of 2,5-dimethylfuranate; 2 mol % of DMNaSIP; 30 mol % of dodecanedioic acid; 130 mol % of 1,4-butanediol;
Tm: 129° C., Tg: −12° C., VN 163

Example 14

68 mol % of 2,5-dimethylfuranate; 2 mol % of DMNaSIP; 30 mol % of brassylic acid; 130 mol % of 1,4-butanediol;
Tm: 130° C., Tg: −13° C., VN 151

Example 15

68 mol % of 2,5-dimethylfuranate; 2 mol % of DMNaSIP; 30 mol % of 1,18-$C_{18}$-dicarboxylic acid; 130 mol % of 1,4-butanediol;
Tm: 133° C., Tg: 3° C., VN 173

Example 16

68 mol % of 2,5-dimethylfuranate; 2 mol % of DMNaSIP; 30 mol % of 1,36-$C_{36}$-dicarboxylic acid; 130 mol % of 1,4-butanediol;
Tm: 137° C., Tg: −33° C., VN 189

Film Composting Test 10 g of polymer were dissolved in 50 ml of hexafluoroisopropanol at 20° C. This polymer solution was poured onto a Petri dish and solvent was evaporated in a fume hood. Films (thickness: about 30 μm) were obtained.

The films were then buried in compost at a depth of 1-2 cm in matured compost from a commercial composting facility (sieved (sieve size: 1 cm) in a Tupperware container and this is closed with a lid. This was incubated in a heating cabinet at 58° C. At regular intervals, drinking water is poured on the compost in order to keep the compost sufficiently moist. After 2 and 4 weeks, film samples were weighed.

Film Composting Test 10 g of polymer were dissolved in 50 ml of hexafluoroisopropanol at 20° C. This polymer solution was poured onto a Petri dish and solvent was evaporated in a fume hood. Films (thickness: about 30 μm) were obtained.

The films were then buried in compost at a depth of 1-2 cm in matured compost from a commercial composting facility (sieved (sieve size: 1 cm) in a Tupperware container and this is closed with a lid. This was incubated in a heating cabinet at 58° C. At regular intervals, drinking water is poured on the compost in order to keep the compost sufficiently moist. After 2 and 4 weeks, film samples were weighed.

TABLE 1

| Examples | V-A | A | B | V-C | C | V-D | D |
|---|---|---|---|---|---|---|---|
| DM-FDCA* | 100 | 98 | 92 | 70 | 68 | 70 | 68 |
| DM-Na-SIP* | 0 | 2 | 8 | 0 | 2 | 0 | 2 |

TABLE 1-continued

| Examples | V-A | A | B | V-C | C | V-D | D |
|---|---|---|---|---|---|---|---|
| Adipic acid* | | | | 30 | 30 | | |
| Sebacic acid* | | | | | | 30 | 30 |
| Ethylene glycol* | 100 | 100 | 100 | | | | |
| 1,4-Butanediol | | | | 100 | 100 | 100 | 100 |
| Weight (initial)** | 100 | 100 | 100 | 100 | 100 | 100 | 100 |
| Weight (after 2 weeks)** | 99 | 95 | 87 | 72 | 61 | 66 | 50 |
| Weight (after 4 weeks)** | 99 | 89 | 73 | 50 | 31 | 45 | 21 |

\* = % by weight
\*\* = %

The invention claimed is:

1. A polyester consisting of:
   A) an acid component composed of:
      a1) 25 to 100 mol % based on the components a1) and a2) of 2,5-furandicarboxylic acid or its esters or mixtures thereof
      a2) 0 to 75 mol % based on the components a1) and a2) of an aliphatic C4-C36-dicarboxylic acid or its esters or mixtures thereof and
      a3) 1 to 10 mol % based on the components a1) to a3) of a sulfonate-containing compound,
      wherein the mol percentages of the components a1) to a3) sum to 100, and
   B) a diol component composed of:
      b1) 98 to 100 mol % based on the components a1) to a3) of component A of a $C_2$- to $C_{12}$-alkanediol or mixtures thereof and
      b2) 0 to 2 mol % based on the components a1) to a3) of a branching agent comprising at least 3 functional groups; and
   C) optionally also one or more components selected from:
      c1) an ether-containing dihydroxyl compound of formula I $$HO-[(CH_2)_n-O]_m-H \quad (I)$$

in which n represents 2, 3 or 4 and m represents an integer from 2 to 250,
      c2) a hydroxycarboxylic acid of formula IIa or IIb

 (IIa)

 (IIb)

in which p represents an integer from 1 to 1500 and r represents an integer from 1 to 4 and G represents a radical selected from the group consisting of phenylene, $-(CH_2)_q-$, wherein q represents an integer from 1 to 5, $-C(R)H-$ and $-C(R)HCH_2$, wherein R represents a methyl or ethyl
      c3) an amino-$C_2$- to $C_{12}$-alkanol or at least one amino-$C_5$- to $C_{10}$-cycloalkanol or mixtures thereof
      c4) a diamino-$C_1$- to $C_8$-alkane
      c5) a 2,2'-bisoxazoline of general formula III

 (III)

wherein $R^1$ represents a single bond, a $(CH_2)_z$-alkylene group, where z=2, 3 or 4, or a phenylene group
      c6) an aminocarboxylic acid selected from the group consisting of caprolactam, 1,6-aminocaproic acid, laurolactam, 1,12-aminolauric acid and 1,11-aminoundecanoic acid
      or mixtures of c1) to c6)
      wherein the components b1) and b2) and optionally c1), c3) and c4) sum to 100 mol % and the components a1) to a3) and optionally c5) sum to 100 mol % and
   D) 0.1% to 4% by weight based on the amount of components A and B and C if present,
      d1) at least one di- or oligo-functional molecule selected from the group consisting of isocyanate and isocyanurate.

2. The polyester according to claim 1, wherein component d1) is 1,6-hexamethylene diisocyanate.

3. The polyester according to claim 1, comprising 0.01 to 1 mol % based on the components a1) to a3) of glycerol (b2).

4. The polyester according to claim 1, comprising 5 to 10 mol % based on the components a1) to a3) of an isophthalic acid-5-sulfonic acid sodium salt (a3).

5. The polyester according to claim 1, comprising 1 to 4.5 mol % based on the components a1) to a3) of an isophthalic acid-5-sulfonic acid sodium salt (a3).

6. The polyester according to claim 1, wherein 100 mol % based on the components a1) and a2) of a 2,5-furandicarboxylic acid or its esters or mixtures thereof are employed.

7. The polyester according to claim 6, wherein component b1) is ethylene glycol.

8. The polyester according to claim 1, comprising 50 to 75 mol % based on the components a1) and a2) of a 2,5-furandicarboxylic acid or its esters or mixtures thereof and 25 to 50 mol % based on the components a1) and a2) of an aliphatic $C_4$-$C_{36}$-dicarboxylic acid or its esters or mixtures thereof.

9. The polyester according to claim 8, wherein component b1) is 1,4-butanediol.

10. An aqueous dispersion comprising the polyester according to claim 4.

11. A process for producing fibers, films and moldings which comprises utilizing the polyesters according to claim 1.

12. A process for paper coating or for impregnation of a nonwoven fabric or article which comprises coating the paper or impregnating the nonwoven fabric or article with the aqueous dispersion according to claim 10.

13. A process for producing the polyesters according to claim 1, wherein dimethyl 2,5-furandicarboxylate is employed as component a1) and isophthalic acid dimethyl ester-5-sulfonic acid sodium salt is employed as component a3).

14. A polyester mixture comprising:
   i) 5% to 95% by weight based on the polyester mixture of the polyester according to claim 1,
   ii) 95% to 5% by weight based on the polyester mixture of at least one or more components selected from the group consisting of: a polyester produced from an aliphatic dicarboxylic acid and an aliphatic diol; polycaprolactone, starch, cellulose, polyhydroxyalkanoate, polyglycolic acid and polylactic acid.

15. Fibers, films and moldings which comprises the polyesters according to claim 1.

16. A paper coating or a nonwoven fabric or article which comprises the aqueous dispersion according to claim 10.

\* \* \* \* \*